United States Patent [19]

Jones

[11] 4,400,729
[45] Aug. 23, 1983

[54] PSEUDO-DC RESTORE APPLICATION TO STARING ARRAY DETECTORS

[76] Inventor: George R. Jones, 113 Northway Rd., Greenbelt, Md. 20770

[21] Appl. No.: 212,296

[22] Filed: Dec. 3, 1980

[51] Int. Cl.³ .......................... H04N 5/16; H04N 5/33
[52] U.S. Cl. .................................... 358/113; 358/166; 358/171; 364/863; 382/10
[58] Field of Search ...................... 364/515, 521, 863; 358/166, 167, 113, 171, 213

[56] References Cited

U.S. PATENT DOCUMENTS 3,985,954 10/1976 Kuniyoshi et al. .................. 358/171

4,214,271 7/1980 Jones et al. ......................... 358/166

Primary Examiner—Felix D. Gruber
Attorney, Agent, or Firm—Robert P. Gibson; Milton W. Lee; Max L. Harwell

[57] ABSTRACT

An adjustment signal is derived for each element in a detector array which depends on the median of the differences of image brightness between that particular detector and all its neighboring detectors. The adjustment signal is derived by integrated circuit techniques on the detector itself. The negative feedback of these adjustment signals to the uncorrected detector outputs will delete the salt-and-pepper noise of the staring array.

1 Claim, 2 Drawing Figures

PSEUDO-DC RESTORE APPLICATION TO STARING ARRAY DETECTORS

The invention described herein may be manufactured, used, and licensed by the U.S. Government for governmental purposes without the payment of any royalties thereon.

BACKGROUND OF THE INVENTION

1. Field of the Invention

The present invention is in the field of staring array detection, and particularly in pseudo DC restoration by integrated circuit techniques on the individual detector outputs and continuous comparison with adjacent detector outputs.

2. Description of the Prior Art

Previously, the pseudo DC restore process of detector outputs in infrared (IR) viewing systems was applied to linear array detectors. Some techniques were synthetic and relied on the application of mathematical algorithms on the detector signals. The pseudo DC restore algorithm derived a correction signal for a member of an array of linear detectors. The correction signal was based on the median of the signals detected by the detector and its previous linear array. Some additional modifications were required to prevent saturation effects, but the correction was the signal proportional to the difference between the medians.

The principal problem addressed in the present invention is the element-to-element variation of the sensitivity parameters of the individual detector element in the array to correct each detector element in the staring array detector system. In the previous DC line-to-line restore process of the scanning detector array system, the signal to correct the linear detector array was derived from one detector in which the direction of propagation was unilateral for accumulated error.

SUMMARY OF THE INVENTION

The present invention is comprised of a pseudo DC restoration application for staring array detectors in which the signal for staring array correction is derived from all adjacent detectors wherein the errors introduced may propogate in all directions to be compared with adjacent uncorrected detector outputs to produce corrected output signals from each detector.

The present staring array detector system is an image detector that is comprised of an array of discrete detector elements on a monolithic semiconductor. The detected signals are controlled and derived by circuit components integrated into the same chip so that degradation can be limited in nearly real time. These detector elements are connected through charge coupled or charge transfer devices (CCDs or CTDs), or similar technology, so that the image information can be transmitted to other components of the system. The present method of pseudo DC restoration is comprised of an approximation of the median of the differences derived from all four of the adjacent discrete detectors whose outputs are accumulated and are applied to each detector being DC restored.

The present method of DC restoratin specifically involves accumulating the comparison difference signals from all of the adjacent detectors in a bias accumulator. Since no storage of signals is involved in the present method, the adaptive corrective signal produced at the output of the bias accumulator is produced in near real time. The adjacent charge signals have the median of their differences derived and added as a continuous adaptive corrective bias to the uncorrected detector outputs generated from each of the detectors in the staring array detector system. A charge is accumulated from the adjacent charge signals in the bias accumulator if the pixel detected signal for each pixel is less than the adjacent charge signals, or the charge is depleted if the detected signal for each pixel is greater than the adjacent charge signals. The bias accumulator time integrates the comparison detected signals of the pixel with adjacent pixels over intervals comparable to the integration time constant. The rate of accumulation is controlled by the average difference in the median of the four signals and the median selected over the same interval. Because the differences derived from all the adjacent diserete detectors are computed as a result of the signal being generated and not the original signal, a stationary image is expected to fade out completely. If some sort of delay to "zero" of the changes is allowed, an over response and recovery of a very low level of the original picture would result which would not suppress the salt-and-pepper noise effect on the output of the staring array imaging system. The blanking however applies equally well to both picture and static noise. Thus, if the source image is allowed to move about, the signal will be retained although somewhat modified and the salt-and-pepper noise will be repressed. It should be noted that in a staring array there must be some movement, such as the platform upon which the imager is mounted or leakage current in the bias accumulator which provides stabilization. Dwell time in the bias accumulator needs to be long enough to provide the leakage current.

The invention will be better understood with reference to the following drawings and description.

DETAILED DESCRIPTION OF PREFERRED EMBODIMENT

Figure 1:
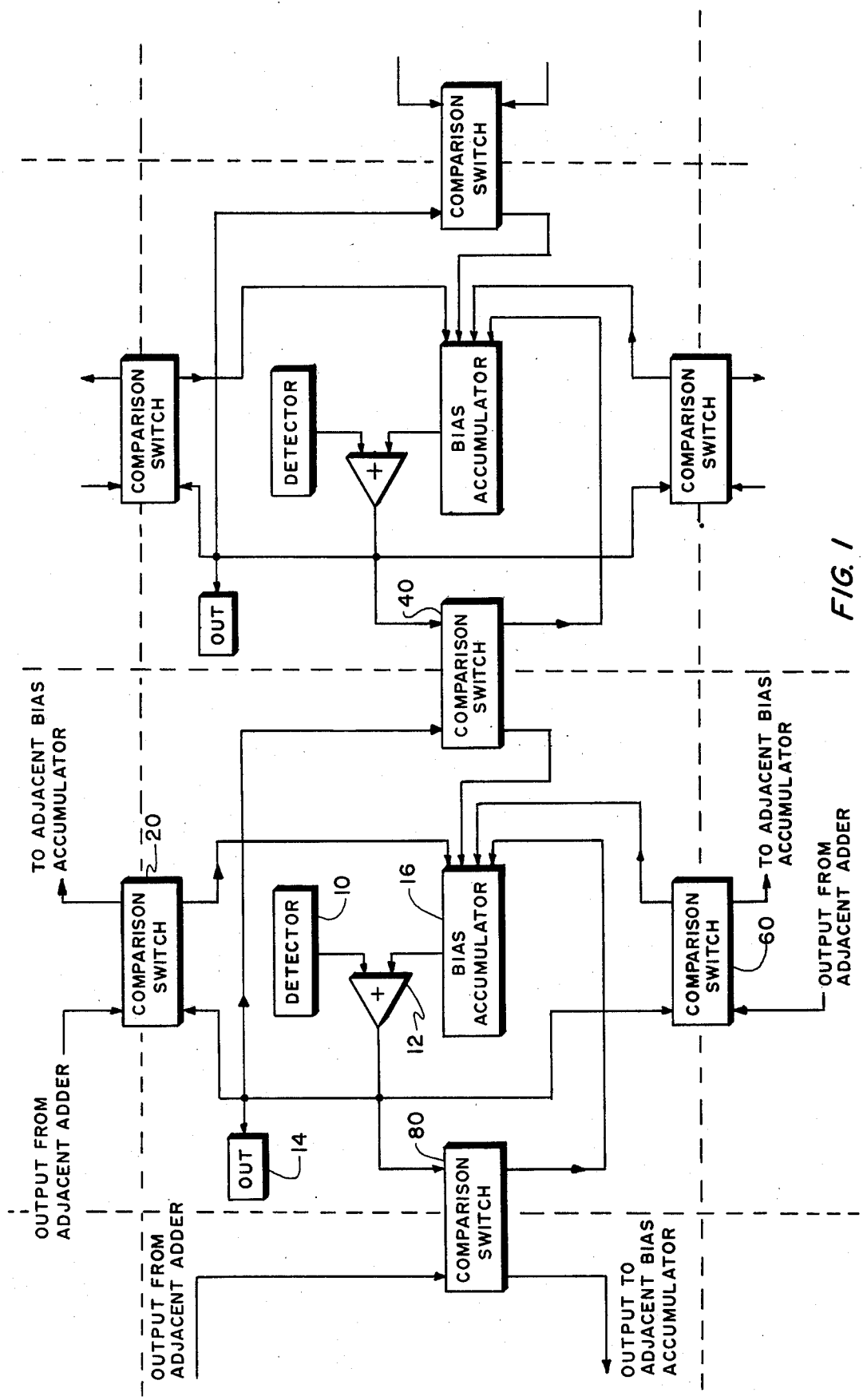
FIG. 1 is a schematic block diagram of one possible implementation of the present spatial median difference filtering of the present invention.
Figure 2:
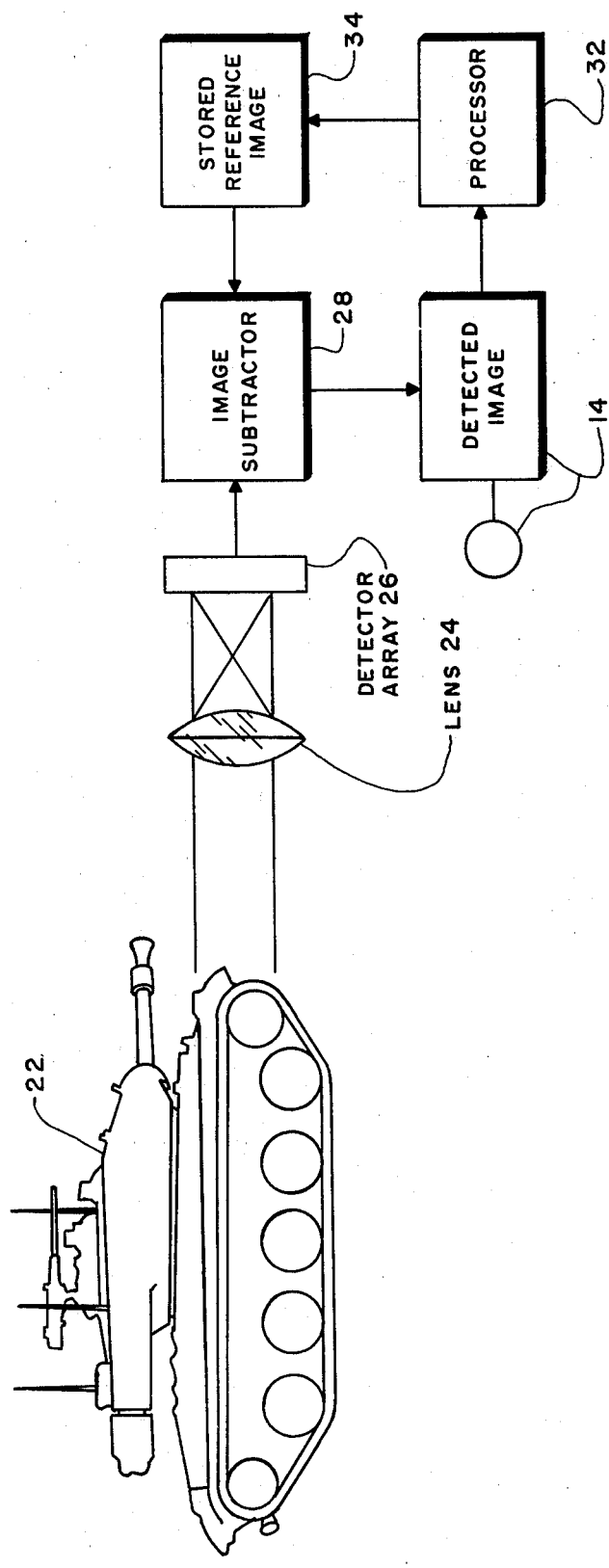
FIG. 2 is a functional block diagram of a previous method of sensor calibration for an array type image detector in which the present invention is an improvement thereover.

Refer to FIG. 1 in which the dashed lines separate two neighbors in an array of individual sensor circuit cells. The two sensor elements are only used to be representative of an entire detector staring array. Each individual sensor cell has its own detector 10, adder 12, output 14 to some readout means, such as CCD, CTD or field-effect-transistor (FET) (not shown), and bias accumulator 16 associated therewith. Comparison means, such as comparison switches 20, 40, 60, and 80, are electrically connected at the intersection between adjacent sensor circuit cells and are electrically coupled with the adjacent cells throughout the entire detector staring array even though only two cells are shown. FIG. 2 illustrates a perspective of a typical detector staring array function when used in the intended environment of, say for example, citing an enemy tank 22 through optics 24 associated with the detector staring array 26. In the previous method as shown by FIG. 2 however the storage requirement often necessitated a periodic maintaince type of regeneration of the reference image 34 which further complicated service and maintenance of the system. The present system does not need a stored reference image at all but rather has continuous DC restoration therein.

The present method of DC restoration for the detector staring array actually combines the previous function of the image subtraction 28, which is the function of the present adder 12, with the processor 32 and stored reference image 34, which are respectively the functions of the present comparison means and the bias accumulator 16, onto the same surface layer as the detector array 26 of a monolithic substrate. The monolithic substrate may be made of many layers of silicon with the photosensitive layer on top and the wiring and switching circuitry within.

Referring to only one sensor cell for explanation of the entire detector array, the light, or IR radiation, is detected by detector 10. The uncorrected detector output generated by the detector 10 that is exposed to the scene radiation is supplied to the adder 12 at one input thereto. Detector 10 may have amplifiers, such as preamplifiers or integrated circuit (IC) amplifier associated therewith for enhancing the uncorrected detector output current supplied to the adder 12. Additional amplification outside of the detectors however is needed. The signal to which the uncorrected detector output current is added is an adaptive corrective signal from the bias accumulator 16. The adaptive corrective signal will be discussed herein below, but is a signal determined by comparison of the uncorrected detector output of each cell with adjacent uncorrected detector outputs. A corrected output signal is continuously produced at the output of the adder 12 when the system is operational. The adder 12 controls how much of the adaptive corrective signal is being used so that the system is not saturated.

Assume that the detector staring array has just been turned on, the adder 12 first provides the uncorrected detector output therethrough that simultaneously is applied at the output 14 to some readout circuitry means (not shown), such as TV type readout or CCD type readout and to the four adjacent comparison switches 20, 40, 60, and 80. The output 14 may be an output bus with FET circuitry, and may possibly have a matrix of cross wires to apply spot voltage differentials across select pixels. The output signal is essentially analog in which the scanned output may be cluster scanning or have some algorithm formation. Outputs from the comparison switches, which are logical, are voltage outputs. Each comparison switch is comparing the output signals from two adjacent detectors and has an output therefrom which goes to the same two adjacent bias accumulators affiliated with each individual sensor circuit cells. Each comparison switch is therefore comparing the output signals from two of the adjacent detector-adder circuits. The properties of each comparison switch are such that a positive (enhancement) signal is transmitted to the adjoining sensor circuit cell that has an output signal representing the lesser of the two compared signals, and conversely a negative (inhibition) signal is transmitted to the adjoining sensor circuit cell that has an output representing the greater of the two compared signals.

The four outputs from the four adjacent comparison switches are applied to and accumulated in the bias accumulator 16 of each of the sensor circuit cells. The bias accumulator 16 provides the adaptive corrective signal that is added with the uncorrected detector output in the adder 12 to produce the continuous corrected output signal which is simultaneously applied to the readout means and to the four adjacent comparison switches for comparison with the four adjoining continuously produced corrected output signals.

The bias accumulator may be comprised of a capacitor charged by the four voltages from the comparison switches through four large resistors, say of 100 kiloohms resistance. Alternatively, the bias accumulator may be an integrated circuit having a reservoir in which electrons may be collected and which has a characteristic time constant that is within the scope of the system operation. The time constant of either the capacitor-resistor circuit or the integrated circuit is a design parameter which is adapted to the type signal being sensed, i.e. either a rapid or a slow charge type signal. The signal outputs from the comparison switches that enter the bias accumulator are integrated over time, and are preferably stabilized by a small leakage outward current. The leakage current out of the resistors in the resistor-capacitor circuit provide movement and therefore stabilization of the image. The integrated circuit has inherent leakage current and reset for stabilization of the imager. When the signals from the comparison switches are of fixed magnitude, i.e. are independent of the magnitude of the difference, the result is the median signal filter where the average of the signals is the median. The operation, or functional form, by which the adaptive corrective signal, or control signal, may take are several. Primarily, the definition of the contol signal in terms of the adjacent pixel signals and the use to which this signal is applied are the logical choices to be made. It is entirely possible that many combinations may be effective, but only one is suggested herein. The specific choices from which the example was selected are (a) a difference signal derived from pixel values, (b) the sum of differences of pixels, (c) a function derived from the differences applied to either an added constant or a multiplicative constant to the detected signal to connect it to output.

For a better understanding of DC restoration of the staring array detectors think in terms of the output from each bias accumulator 16 and adder 12 as being fed to all of the comparison switches associated with the four adjacent sensor circuit cells. Each comparison switch compares the two output signals from adjacent adders as stated above and provides a voltage output signal therefrom back to the bias accumulator 16 of the adjacent sensor circuit cells. Each of the bias accumulators has four individual voltage inputs thereto from the four adjacent comparison switches. The comparison switches themselves have an actual transfer function which may be a logical "on-off" signal or any other single valued function. The bias accumulator 16 has a reference image continuously stored therein by the accumulation of the compared four adjacent signals, and provides the adaptive corrective control signal to adder 12 in accordance with the reference image. The present system may code different electrically encoded image data of the detected image at the output 14.

I claim:

1. A method of DC restoration in a staring array detector system on a monolithic semiconductor by continuously comparing the detector output of each sensor cell with the outputs from detectors in adjacent sensor cells over all of the staring array, said means comprising:

generating an uncorrected detector output from each of the detectors in said staring array detector system;

supplying the generated uncorrected detector output to one of two inputs of an adder;

providing an output signal from said adder which is applied by circuit components integrated into said monolithic semiconductor to readout means and is simultaneously applied to signal comparison means in four adjacent comparison switches for comparing said output signal from said adder in said signal comparison means to the output signals from each of the adjacent adders;

accumulating the compared signals from said four adjacent comparison means in a bias accumulator to provide a continuous adaptive corrective signal therefrom wherein the rate of accumulating is controlled by the average difference in the median of the four adjacent compared signals and a median selected over the same interval; and applying said adaptive corrective signal to a second input of said adder for combining with the generated uncorrected detector output to produce a corrected output signal which is continuously produced by said adder to said readout means and to said signal comparison means and said bias accumulator for providing pseudo DC restore application to said staring array detector system.

* * * * *